United States Patent

[11] 3,622,447

| [72] | Inventors | Willem J. van der Geer<br>Oosterbeek;<br>Popke Wietsma, Arnhem, both of<br>Netherlands |
|---|---|---|
| [21] | Appl. No. | 27,419 |
| [22] | Filed | Apr. 10, 1970 |
| [45] | Patented | Nov. 23, 1971 |
| [73] | Assignee | The B. F. Goodrich Company<br>New York, N.Y. |

[54] PROCESS FOR THE MANUFACTURE OF BONDED FIBER SHEETS
8 Claims, No Drawings

[52] U.S. Cl................................................. 162/168,
161/170, 162/169, 260/17, 260/29.6
[51] Int. Cl................................................... D21h 3/40
[50] Field of Search........................................... 161/150,
170; 162/164, 168, 169; 260/17, 29.6 PT

[56] References Cited
UNITED STATES PATENTS

| 2,760,884 | 8/1956 | Graf, Jr. ........................ | 260/17 |
| 2,601,597 | 6/1952 | Daniel, Jr. et al............. | 162/164 |
| 3,511,747 | 5/1970 | Davies........................... | 161/170 |
| 3,320,066 | 5/1967 | Garth ............................ | 162/164 |
| 3,436,303 | 4/1969 | Raymond et al............... | 162/168 |

*Primary Examiner*—William J. Van Balen
*Assistant Examiner*—Linda C. Koeckert
*Attorneys*—J. Hughes Powell, Jr. and Ernest K. Bean

ABSTRACT: The invention relates to a process for the manufacture of bonded fiber sheets, by which process an aqueous polymer latex is mixed, in the presence of a thickening agent, with a coagulant for the latex, followed by mixing with fibers, after which the resulting suspension of fibers and coagulated latex particles is in a usual manner formed into a bonded sheet. The term "polymer latex" is meant to include here both latices of synthetic and/or natural rubbers in a narrower sense and a dispersion in water of a coagulable polymer such as polyvinyl chloride and copolymers thereof.

PROCESS FOR THE MANUFACTURE OF BONDED FIBER SHEETS

BACKGROUND OF THE INVENTION

Canadian Pat. No. 699,360 describes the coagulation of a polymer latex in the presence of an excess of a protective agent to obtain binder particles for fiber sheets. To be effective the protective agent in this process must be stable while coagulation occurs, i.e., it must not be precipitated by or form insoluble salts with the coagulant.

It is pointed out that British Pat. No. 1,042,552 concerns the coagulation of a rubber latex while mixed with fibers and in the presence of a protective colloid. The resulting suspension is formed into a paperlike or textilelike fiber sheet, for instance on a papermaking machine. The processing into bonded fiber sheets may comprise, inter alia, the steps of drying, pressing, with or without the application of heat, impregnating with resins and the like, patterning, et cetera.

It has been found, however, that the sheets obtained by the known process often have insufficient strength and/or elongation either in wet or dry condition for application in practice, and that on the whole the reproducibility of the sheet quality is not fully satisfactory either. Improvement may be obtained to some extent by subjecting the sheets to an aftertreatment with additional aids, but this involves an extra process step and usually leads to a decrease in flexibility or suppleness of the product.

An additional and serious drawback of the known process is that the coagulated polymer particles show a wide variation in particle size. This variation not only makes it difficult to obtain sheets of uniform quality but also leads to an inconstant and often insufficient retention on the sheet-forming screen, resulting in waste of material.

It has now been found that the aforedescribed drawbacks can be obviated in a surprisingly simple manner. It is not necessary to submit the fibers to a pretreatment.

SUMMARY OF THE INVENTION

Process for the manufacture of bonded fiber sheets, by which process an aqueous polymer latex is mixed, in the presence of a thickening agent, with a coagulant for the latex, followed by mixing with fibers, after which the resulting suspension of fibers and coagulated latex particles is in a usual manner formed into a bonded sheet, characterized in that the thickening agent is applied in an amount of at least 4 percent by weight, calculated on the solids content of the latex, and the thickening agent and the coagulant are so chosen that upon coagulation of the latex the coagulant will, moreover, cause the thickening agent largely to flocculate.

DETAILED DESCRIPTION

The invention is characterized in that the thickening agent is applied in an amount of at least 4 percent by weight, calculated on the solids content of the latex, and the thickening agent and the coagulant are so chosen that upon coagulation of the latex the coagulant will, moreover, cause the thickening agent largely to flocculate.

Although the remarkable result obtained by the application of the process according to the invention cannot be quite accounted for, it is found that the flocculated thickening agent causes the bonding usually obtained with the polymer particles to be strongly promoted. The increase in sheet strength is in fact far more pronounced than might be expected on the basis of the individual agents. Moreover, the variation in particle size of polymer coagulated under the conditions according to the invention is found to have considerably decreased, thus making it possible to achieve a virtually complete retention as the sheet is formed.

In the process according to the invention use may in principle be made of any thickening agent which is, moreover, caused largely to flocculate by a coagulant suitable for the latex. By flocculation is to be understood here flocculation of the agent as such as a result of a change in the medium, as well as precipitation owing to the agent forming an insoluble compound with the coagulant.

Combinations of thickening agents and coagulants that are suitable to obtain the envisaged flocculation may be determined in simple experiments carried out beforehand.

It has, for instance, been found that when applied in combination with an aqueous solution of an aluminum salt such as alum or aluminum sulfate, agents such as polyacrylates and carboxymethylcellulose, which are often employed for the stabilization or thickening of latices, are very suitable to be used as a coagulant according to the process of the present invention. In that case flocculation of the aforementioned thickening agents takes place owing to the formation of insoluble aluminum compounds.

To obtain a marked improvement in sheet strength and a reduced variation in particle size it is generally desirable that the thickening agent should be applied in an amount of at least 4 percent by weight, but preferably at least 8 percent by weight, calculated on the solids content of the latex. Theoretically, the amount of thickening agent can be increased to a point at which processing difficulties will arise. Practice has shown, however, that there is little point in employing the thickening agent in an amount of more than 40 percent by weight, since the sheet strength is as a rule sufficiently improved using a smaller amount. Moreover, the application of higher amounts not only makes the process more expensive but it may even cause the sheet strength to decrease again. Optimum results are generally obtained if the thickening agent is employed in an amount of from 8 to 20 percent by weight.

In the process according to the present invention it is in principle possible to employ any type of a coagulable synthetic or natural polymer latex. Examples thereof are styrene-butadiene copolymer latices, polymer latices prepared from acrylates, acrylonitrile, vinyl chloride and the like, and, more particularly, copolymers of the aforedescribed type that have been modified with reactive groups. Copolymers of the latter type are obtained, for instance, by copolymerization with olefinically unsaturated carboxylic acids or hydroxy compounds.

The coagulant is added to the polymer latex in which the desired amount of thickening agent has been incorporated, after which the suspension of the coagulated latex particles and the flocculated thickening agent is mixed with the fiber slurry.

Said method is excellently suitable for application in a continuous process in which separate streams of coagulant and latex are continuously fed to a coagulating tank and the resulting coagulate suspension is continuously discharged. The shape and size of the coagulate particles are largely controllable by varying the degree of dilution of the streams and the intensity of mixing, in the given case the speed of the stirrer. The discharged coagulate suspension may then be mixed with the fiber slurry in a likewise continuous manner, after which the resulting mixture may, if desired, be fed directly to the sheet-forming machine. This procedure permits the realization of a fully integrated sheet-forming process.

The present invention also relates to sheetlike products entirely or partially made up of bonded fiber sheets obtained by the aforedescribed process.

The invention will be described further in the following examples.

EXAMPLE I

A number of experiments are carried out using a latex of an acrylate polymer (Hycar 2600 H 35, marketed by N. V. Chemische Industrie AKU-Goodrich).

In these experiments as thickening agents different amounts of carboxymethyl cellulose (CMC) are dissolved in the latex, the solution, when necessary, being diluted with water to ensure a good processability.

The coagulant is an aluminum sulfate solution in water which has been diluted so as to suit the object envisaged.

The latex is gradually added to the coagulant with stirring, after which the stirrer is switched off. The resulting coagulate suspension is then mixed with an 0.1 percent by weight suspension in water of rayon fibers of 1.5 filament denier, 6 mm. long. In all the experiments the mixture ratio of coagulate particles to fibers is approximately 20:100.

Thereupon, the aqueous suspension of the coagulate-fiber mixture thus prepared is on a screen formed into sheets having a weight per unit area of about 50 g./m.$^2$, the retention of the solid particles on the screen being practically complete.

After the sheets have been dried to the air and cured at 150° C., for 5 minutes, they are conditioned for 24 hours in air having a relative humidity of 56 percent.

The sheets are then immersed in water for 24 hours, after which the dry and wet breaking lengths are determined.

The results of the experiments are summarized in table A.

TABLE A

| Parts CMC per 100 parts solid matter in latex | Coagulant | | Latex | | Sheet breaking length in meters | |
|---|---|---|---|---|---|---|
| | Concentration, percent | Volume, ml. | Solid matter, percent | Volume, ml. | Dry | Wet |
| 0 | 0.28 | 180 | 5 | 20 | 260 | 80 |
| 2 | 0.28 | 180 | 5 | 20 | 1,040 | 120 |
| 4 | 0.36 | 140 | 1.7 | 60 | 1,130 | 160 |
| 6 | 0.62 | 80 | 0.8 | 120 | 1,810 | 200 |
| 10 | 0.38 | 260 | 0.42 | 240 | 2,050 | 240 |
| 20 | 0.38 | 260 | 0.42 | 240 | 2,120 | 290 |
| 40 | 0.38 | 260 | 0.42 | 240 | 1,785 | 175 |
| 60 | 0.56 | 180 | 0.31 | 320 | 1,395 | 160 |
| 80 | 0.62 | 160 | 0.29 | 340 | 1,110 | 120 |

EXAMPLE II

The experiments of example I are repeated using a latex of polyvinyl chloride (Geon 576, made by N. V. Chemische Industrie AKU-Goodrich).

The results are summarized in table B.

TABLE B

| Parts CMC per 100 parts solid matter in latex | Coagulant | | Latex | | Sheet breaking length in meters | |
|---|---|---|---|---|---|---|
| | Concentration, percent | Volume, ml. | Solid matter, percent | Volume, ml. | Dry | Wet |
| 0 | 0.28 | 180 | 5 | 20 | 1,040 | 135 |
| 2 | 0.28 | 180 | 5 | 20 | 1,200 | 280 |
| 4 | 0.36 | 140 | 1.7 | 60 | 2,020 | 310 |
| 6 | 0.62 | 80 | 0.8 | 120 | 2,630 | 400 |
| 10 | 0.38 | 260 | 0.42 | 240 | 2,050 | 560 |
| 20 | 0.38 | 260 | 0.42 | 240 | 2,150 | 485 |
| 40 | 0.38 | 260 | 0.42 | 240 | 1,140 | 270 |
| 60 | 0.38 | 260 | 0.42 | 240 | 695 | 240 |
| 80 | 0.62 | 160 | 0.29 | 340 | 745 | 170 |

EXAMPLE III

The experiments of example I are repeated using a latex of a styrene-butadiene copolymer (Hycar 2500 H 34, marketed by N. V. Chemische Industrie AKU-Goodrich).

The results are summarized in table C.

TABLE C

| Parts CMC per 100 parts solid matter in latex | Coagulant | | Latex | | Sheet breaking length in meters | |
|---|---|---|---|---|---|---|
| | Concentration, percent | Volume, ml. | Solid matter, percent | Volume, ml. | Dry | Wet |
| 0 | 0.28 | 180 | 5 | 20 | 70 | — |
| 2 | 0.31 | 160 | 2.5 | 40 | 420 | — |
| 4 | 0.36 | 140 | 1.7 | 60 | 1,115 | 50 |
| 6 | 0.62 | 80 | 0.8 | 120 | 2,120 | 160 |
| 10 | 0.38 | 260 | 0.42 | 240 | 2,370 | 230 |
| 20 | 0.38 | 260 | 0.42 | 240 | 2,660 | 225 |
| 40 | 0.38 | 260 | 0.42 | 240 | 1,020 | 130 |
| 60 | 0.56 | 180 | 0.31 | 320 | 1,220 | 120 |
| 80 | 0.62 | 160 | 0.29 | 340 | 875 | 140 |

EXAMPLE IV

To compare the variation in breaking length of sheets manufactured by the known process and those made by the process according to the invention, a number of experiments are carried out using latices made up of two different acrylate polymers (60 parts by weight Hycar 2671 and 40 parts by weight Hycar 2600×138), the latices containing, respectively, 2 and 20 parts CMC per 100 parts of solid matter. Said variation may serve as a measure of the particle retention on the sheet-forming screen, casu quo the attainable uniformity in sheet quality.

In all the experiments the starting material is formed by 10 g. latex having a solids content of 5 percent and diluted with 950 ml. water. To the dilute latex are gradually added with stirring, 50 ml. of a 1 percent by weight aqueous solution of aluminum sulfate.

Use is made of a stirrer (RM 27 D type) with a 3-hole blade which is rotated at two speeds, viz. 100 and 200 revolutions per minute respectively.

After coagulation the coagulate suspension is mixed with a 500 ml. suspension in water of rayon fibers of 1.5 filament denier, 6 mm. long. Using an 80-mesh screen the resulting suspension mixture is then formed into sheets, which are dried to the air. Of the breaking lengths measured on the dried sheets the variation in the values obtained is determined statistically.

The results are summarized in table D.

TABLE D

| | 2 parts CMC | | 20 parts CMC | |
|---|---|---|---|---|
| | 100 r.p.m. | 200 r.p.m. | 100 r.p.m. | 200 r.p.m. |
| Number of experiments | 30 | 30 | 30 | 28 |
| Average breaking length in meters | 70 | 42 | 1,232 | 1,029 |
| Standard deviation | 22.3 | 15.0 | 135.8 | 116.7 |
| Coefficient of variation, percent | 31.8 | 35.6 | 11.0 | 11.3 |

From table D it can be seen that the application of the process according to the invention gives a marked decrease of the coefficient of variation (relative variation).

As is known, an increased stirrer speed generally leads to the formation of smaller coagulate particles and, hence, a lower retention on the screen. From the average breaking length values found in the aforedescribed experiments it can be seen that the present invention also offers the advantage of improved retention on the screen.

EXAMPLE V

The experiments of example I are repeated using as coagulant an aqueous solution of calcium chloride. For use in combination with CMC according to the invention this agent is found unsuitable. Even at a concentration of 40 parts CMC per 100 parts of solid matter in the latex no flocculation of the thickening agent takes place, nor is there any appreciable improvement in breaking length.

An example of a thickening agent other than CMC and which may be used as a coagulant in combination with an aluminum salt solution is polyacrylate (latecol AS made by BASF).

When this coagulant is used in experiments as described in example I, the results obtained are of the same order of magnitude as those listed in table A.

EXAMPLE VI

In comparative experiments a mixture comprising 0.16 g. carboxymethylcellulose (CMC) and 40 cm.$^3$ of a 10 percent styrene-butadiene copolymer latex (Hycar 2500 H 34) or of a 10 percent acrylate polymer latex (Hycar 2671) is added while stirring (stirrer speed 100 r.p.m.) to one liter of a 2 wt. percent fiber suspension. After 5 minutes 80 cm.$^3$ of a 1 wt.

percent aqueous solution of aluminum sulfate are added. After coagulation for 10 minutes the suspension obtained is worked into fiber sheets having a 50 g./m.² weight per unit area. Table E summarizes the measured values for the breaking length and elongation in dry as well as in wet condition (after 24 hours immersion in water).

The above experiments are repeated, however, with the difference that the latex mixed with CMC is first coagulated in a laboratory coagulator using a stirrer speed of 1,500 r.p.m. The coagulate suspension obtained is subsequently mixed with the fiber suspension. Again sheets are made having a weight per unit area of about 50 g./m.² The measured properties are summarized in table E.

TABLE E

| | Comparison | | | | Invention | | | |
|---|---|---|---|---|---|---|---|---|
| | Sheet breaking length in m. | | Elongation, percent | | Sheet breaking length in m. | | Elongation, percent | |
| Latex | Dry | Wet | Dry | Wet | Dry | Wet | Dry | Wet |
| 2500 II34 | 150 | Nihil | 4 | Nihil | 1,790 | 130 | 7 | 8 |
| 2671 | 48 | do | 9 | do | 1,130 | 215 | 8 | 7 |

I claim:

1. Process for the manufacture of bonded fiber sheets, by which process an aqueous polymer latex is mixed, in the presence of a thickening agent, with a coagulant for the latex, followed by mixing with fibers, after which the resulting suspension of fibers and coagulated latex particles is formed into a bonded sheet, characterized in that the thickening agent is applied in an amount of at least 4 percent by weight, calculated on the solids content of the latex, and the thickening agent and the coagulant are so chosen that upon coagulation of the latex the coagulant will cause the thickening agent to flocculate.

2. Process according to claim 1, characterized in that the thickening agent is used in an amount of from 8 to 20 percent by weight, calculated on the solids content of the latex.

3. Process according to claim 2, characterized in that as thickening agent use is made of carboxymethyl cellulose and as coagulant an aqueous solution of an aluminum salt.

4. Process according to claim 2 characterized in that the thickening agent is a polyacrylate and the coagulant is an aluminum salt.

5. Process according to claim 2 wherein the latex is a polymer latex of an acrylate.

6. Process according to claim 2 wherein the latex is a polymer latex of vinyl chloride.

7. Process according to claim 2 wherein the latex is a polymer latex of acrylonitrile.

8. Process according to claim 2 wherein the latex is a polymer latex of butadiene.

* * * * *